(12) United States Patent
Cohen et al.

(10) Patent No.: US 6,751,608 B1
(45) Date of Patent: *Jun. 15, 2004

(54) METHOD AND APPARATUS FOR IMPROVING END TO END PERFORMANCE OF A DATA NETWORK

(75) Inventors: Edith Cohen, Berkeley Heights, NJ (US); Balachander Krishnamurthy, New York City, NY (US); Jennifer Lynn Rexford, Summit, NJ (US)

(73) Assignee: AT&T Corp., New York, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 09/977,400

(22) Filed: Oct. 16, 2001

Related U.S. Application Data

(63) Continuation of application No. 09/105,018, filed on Jun. 26, 1998, now Pat. No. 6,330,561.

(51) Int. Cl.[7] .............................................. G06F 17/30
(52) U.S. Cl. ................ 707/3; 707/2; 707/8; 707/10; 707/102; 707/104; 709/225; 709/245; 713/201
(58) Field of Search .......................... 707/2, 3, 10, 8, 707/102, 104; 709/225, 218, 217, 245; 713/201

(56) References Cited

U.S. PATENT DOCUMENTS

| | | | | | |
|---|---|---|---|---|---|
| 5,729,689 A | * | 3/1998 | Allard et al. | ............... | 709/228 |
| 5,754,939 A | * | 5/1998 | Herz et al. | ................... | 455/4.2 |
| 5,805,809 A | * | 9/1998 | Singh et al. | ................ | 709/203 |
| 5,864,852 A | * | 1/1999 | Luotonen | .................... | 713/201 |
| 5,918,013 A | * | 6/1999 | Mighdoll et al. | ........... | 709/217 |
| 5,924,116 A | * | 7/1999 | Aggarwal et al. | .......... | 711/122 |
| 5,933,832 A | * | 8/1999 | Suzuoka et al. | ............ | 707/101 |
| 5,935,207 A | * | 8/1999 | Logue et al. | ................ | 709/219 |
| 5,950,205 A | * | 9/1999 | Aviani, Jr. | .................. | 707/103 |
| 5,987,523 A | * | 11/1999 | Hind et al. | ................. | 709/245 |
| 5,996,022 A | * | 11/1999 | Krueger et al. | ............. | 709/247 |
| 6,012,083 A | * | 1/2000 | Savitzky et al. | ............ | 709/202 |
| 6,029,175 A | * | 2/2000 | Chow et al. | ................ | 707/104 |
| 6,032,184 A | * | 2/2000 | Cogger et al. | ............. | 709/223 |
| 6,038,601 A | * | 3/2000 | Lambert et al. | ............ | 709/226 |
| 6,065,058 A | * | 5/2000 | Hailpern et al. | ............ | 709/231 |
| 6,070,184 A | * | 5/2000 | Blount et al. | ............... | 709/200 |
| 6,085,193 A | * | 7/2000 | Malkin et al. | ................ | 707/10 |
| 6,092,204 A | * | 7/2000 | Baker | ......................... | 713/201 |
| 6,145,003 A | * | 11/2000 | Sanu et al. | .................. | 709/225 |
| 6,151,601 A | * | 11/2000 | Papierniak et al. | ........... | 707/10 |
| 6,212,560 B1 | * | 4/2001 | Fairchild | ..................... | 709/223 |
| 6,282,542 B1 | * | 8/2001 | Carneal et al. | ............... | 707/10 |
| 6,505,241 B2 | * | 1/2003 | Pitts | ............................ | 709/218 |

* cited by examiner

*Primary Examiner*—Thuy N. Pardo
(74) *Attorney, Agent, or Firm*—William Ryan

(57) ABSTRACT

A method and apparatus provide improved cache coherency and more effective caching operations without placing an undue burden on network links. A proxy receives a request for a resource and then, depending on information in the proxy cache, generates a resource request for transmission to a resource server. The proxy appends a proxy filter to the request. The resource server maintains one or more volumes of resources based on some predetermined criterion that can be either static or dynamic in nature. Upon receipt of the request and the proxy filter the resource server generates a request response and a piggybacked list of additional resources selected from the volume with which the requested resource is associated.

12 Claims, 3 Drawing Sheets

METHOD AND APPARATUS FOR IMPROVING END TO END PERFORMANCE OF A DATA NETWORK

CROSS-REFERENCE TO RELATED PATENT APPLICATION

This patent application is a continuation application of Ser. No. 09/105,018, filed Jun. 26, 1998, now U.S. Pat. No. 6,330,561 all of which is incorporated herein by reference.

BACKGROUND OF THE INVENTION

The present invention is directed to a method and apparatus for improving end to end performance of a data network. More particularly, the present invention is directed to a method and apparatus for facilitating the update of a proxy cache in a data network.

The exponential rate of growth of the World Wide Web has led to a dramatic increase in Internet traffic, as well as a significant degradation in user-perceived latency while accessing "web pages". Web servers store hundreds or thousands of pages each of which consist of one or more typed resources (e.g., text, in line images, applets, etc.). As the popularity of the web increases, these servers support an increasing number of requests to transfer resources and validate copies that are cached in other locations. For instance, as shown in FIG. 1 of the present application, a client at computer 101, which can be a personal computer, laptop or other known computing device, is connected to a data network gateway, in this instance an Internet service provider (ISP) 102. The gateway provides access to the data network, here Internet 103. Within the data network there are a plurality of resource servers, e.g., 104 and 105, which store content or resources which may be of interest to various clients. To facilitate access by a client to a particular resource, the gateway or ISP may have associated therewith a cache structure. An example of such a structure is shown as proxy cache 106. The cache would be constituted by a memory structure which can store resources after they have been retrieved from a resource server. For instance, as shown in the flow diagram of FIG. 2, the ISP may receive a resource request, step 200. Before accessing a resource server in the Internet the ISP can check its proxy cache 106 to determine whether it has a valid copy of the requested resource, step 201. It may determine whether it has a valid copy of the resource by first determining that it has a copy of the resource in the cache at all and then determining the freshness of the resource. This latter characteristic of the resource may be determined in part based upon information associated with the resource in the proxy cache such as information identifying the time that the resource was last retrieved from one of the resource servers. This technique of keeping track of a time to live (TTL) for the resource provides some estimate of the likelihood that the resource within the proxy cache is still fresh or has been modified. If it is determined that the cache has a valid copy of the resource then the ISP can send a copy of the resource to the requester without submitting the request out into the Internet to the resource server, step 202. If the proxy cache does not have a valid copy of the resource then the ISP will send a request for a resource to a resource server, step 203. The resource server would then send a valid copy of the resource back to the ISP acting as a proxy server which would in turn would both send the resource to the requester and cache the resource in the proxy cache, steps 204, 205 and 206.

It is known to modify the above method to provide even stronger cache coherency by sending a request to validate the copy of the resource in the proxy cache. In this circumstance, the proxy server may either determine that the resource does not appear fresh or opt in all circumstances to send a resource identifier to the resource server asking the resource server to send the resource back to the proxy server if the resource has been changed since the last time that the proxy cache validated the resource. In the TCP/IP environment this is referred to as a GET-If Modified-Since request. In this circumstance then the resource server can either advise the proxy cache that the resource maintained in the proxy cache is still valid or alternatively if the resource is no longer valid can send a fresh copy of the resource in response to the request.

It should be noted that data transfers on the network links impart a heavy load on not only those links but on the routers between the servers and the client sites. The round-trip delays in establishing a TCP connection and initiating a request, as well as the waiting time at the server and the limited network bandwidth for transferring the response message, translate into user-perceived latency. While caching resource information in proxy caches may somewhat reduce this latency, the validation procedures known in the prior art still introduce substantial loads on the network resources thereby introducing possible-choke points or delays.

In a related application assigned to the same assignee as the present application, entitled "Method and Apparatus for Cache Validation for Proxy Caches" filed on Dec. 30, 1997 it was suggested that network performance could be improved by piggybacking additional requests for resource validation upon a request for a particular resource asked for by a client. In particular, in this related application when the proxy server received a request for a resource, the proxy server might determine which other resources present in its cache were received from the same resource server as the client requested resource. Then the proxy server would forward a request for validation with respect to the client requested resource and a request for validation with regard to one or more additional resources in the proxy cache that were from the same resource server. A return message from the resource server would include information about the client requested resource as well as information about the additional resources identified in this piggyback cache validation signal. While this approach is a benefit to the proxy cache in the sense that it helps the proxy cache determine the validity of certain of its contents at an earlier time, that method does not take into account the notion that when a client requests a first resource there is a substantial probability that there is a particular subset of additional resources which might be requested by the same client following the initial request. This subset of additional resources is related to the initial request either in content or by its location. It would be beneficial if a technique could be provided by which the proxy cache-validation techniques could take advantage of the likelihood that certain resources are sufficiently related to one another such that one or more additional resources are likely to be requested after the first resource is requested.

SUMMARY OF THE INVENTION

In accordance with an embodiment of the present invention resources can be grouped together into volumes. The resources in a given volume are deemed to be related to one another according to one or more criterion. In particular, it is possible that all of the resources of a given volume are related to one another based on a given directory level in the path name. Alternatively, resources could be grouped together in a volume based on a probablistic determination that once a given resource has been requested it is likely that the additional resources in the volume will also be requested. Another possible criterion relates to the content type of the resource. It is also possible that a given volume can be constituted by resources from two or more resource servers. Furthermore, it is also conceivable that all of the resources at a given resource server could be considered to constitute a single volume. In accordance with an embodiment of the present invention when the proxy server sends a resource request to either a resource server or to a volume center which acts on behalf of a set of resource servers, it also sends a proxy filter with the request. The proxy filter identifies certain criteria of interest to the proxy server with regard to any additional resources which might be in the same volume as the requested resource. Upon receipt of the resource request and proxy filter the resource server or volume center selects one or more additional resources from the volume associated with the requested resources utilizing the criterion identified in the proxy filter. A resource request response is then generated and sent back to the proxy server. Appended to that response is information about additional resources selected from the volume using the proxy filter criteria. The proxy server, upon receipt of this information from the resource server or volume center can then forward the appropriate requested resource to the requesting client and can update its proxy cache to indicate the extent to which already cached resources are valid or invalid. It can also make a determination whether to pre-fetch any of the additional resources identified in the appended additional information.

Further details with regard to an embodiment of the present invention and alternative configurations within the embodiment will be described in the detailed description that follows.

DETAILED DESCRIPTION OVERVIEW

Figure 1:
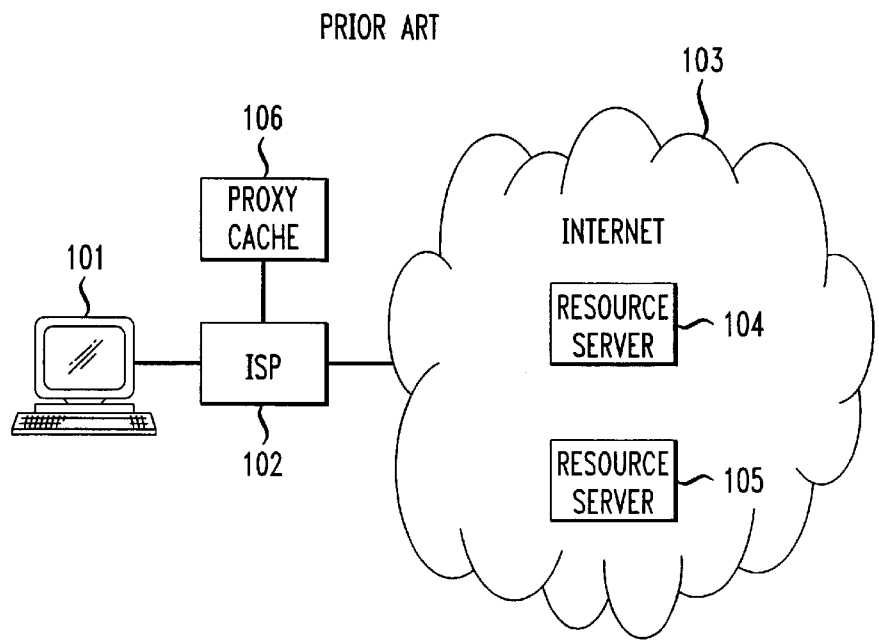
FIG. 1 illustrates a prior art network in which the present invention can be employed.
Figure 2:
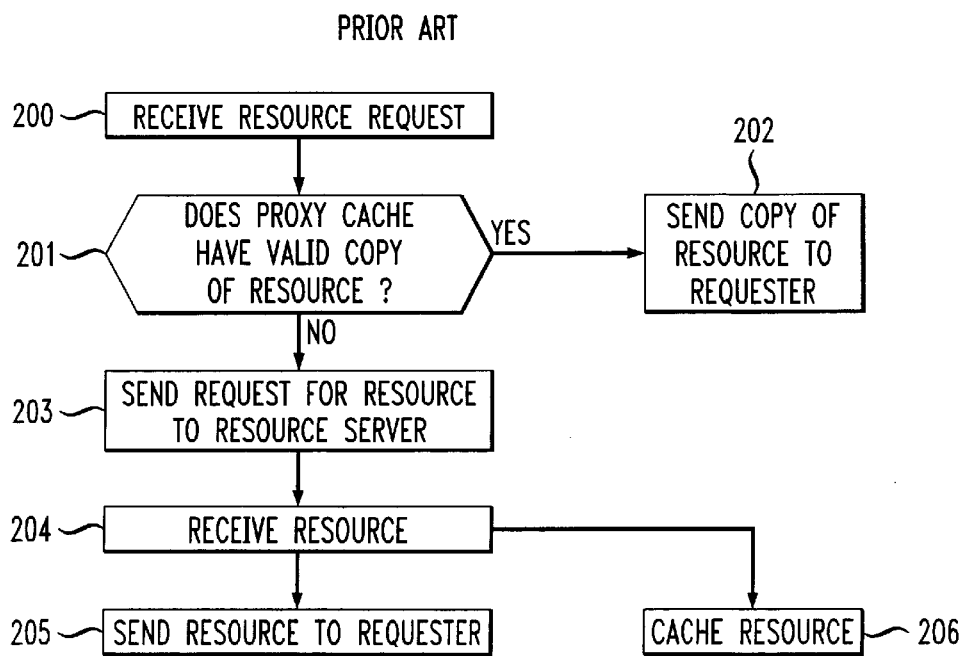
FIG. 2 provides a flow diagram with respect to a known technique for servicing resource requests in the network of FIG. 1.

The present invention can be implemented in a network similar to that illustrated in FIG. 1 of the present application. The present invention alters the process by which the proxy cache and the resource server(s) interact with one another so as to enhance the caching operations while reducing the overall load of data transfers along the network links. More particularly, in accordance with an embodiment of the present invention resources throughout the network can be grouped into volumes. Each volume associates a plurality of resources based on any number of different types of criteria. For example, resources might be grouped together such that all of the resources of a particular server are deemed to constitute a single volume. Alternatively, to reduce the volume size, the server can group resources with the same directory prefix in their path names, up to some number of levels. Alternatively, volumes could be formed in accordance with a determination of the probability that certain additional resources will be requested after a particular resources has been requested. A more detailed description of how to create such a probability-based volume will be described below. However, at this level of description of the invention it is sufficient to understand that it is possible to group resources into volumes using criteria such as that described above.

The present invention provides that the server can append a piggyback response to a response to a request for a particular resource. That piggyback response would include information about additional resources which come from the same volume as the requested resource. To further refine the piggyback response technique, the present invention provides that the proxy requesting the additional resource sends to the resource server both the request and a filter which is to be employed in selecting the additional resources for which information will be supplied. This filter will be referred to as a proxy filter. A more detailed description of how such a proxy filter can be generated will be described below.

Figure 3:
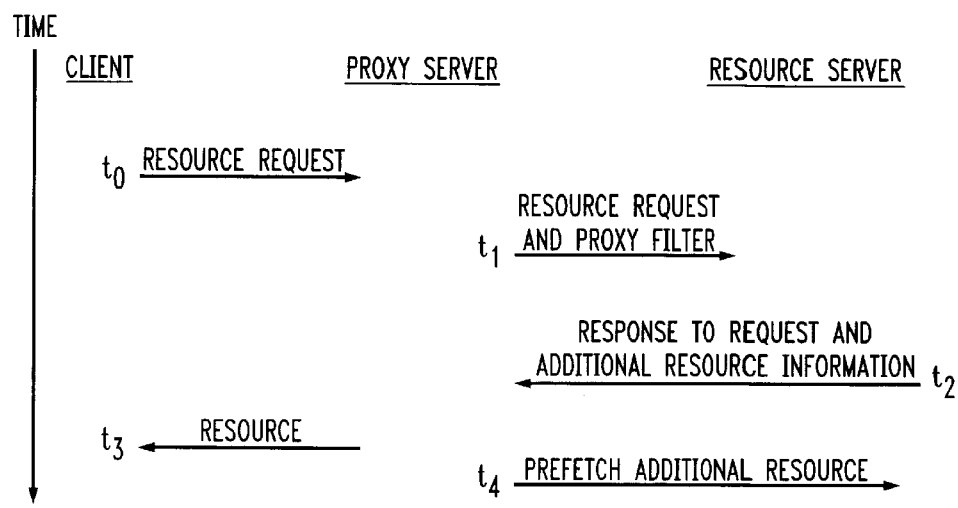
FIG. 3 provides an illustration of a time line of processes which can take place in accordance with an implementation of the present invention.
Figure 6:
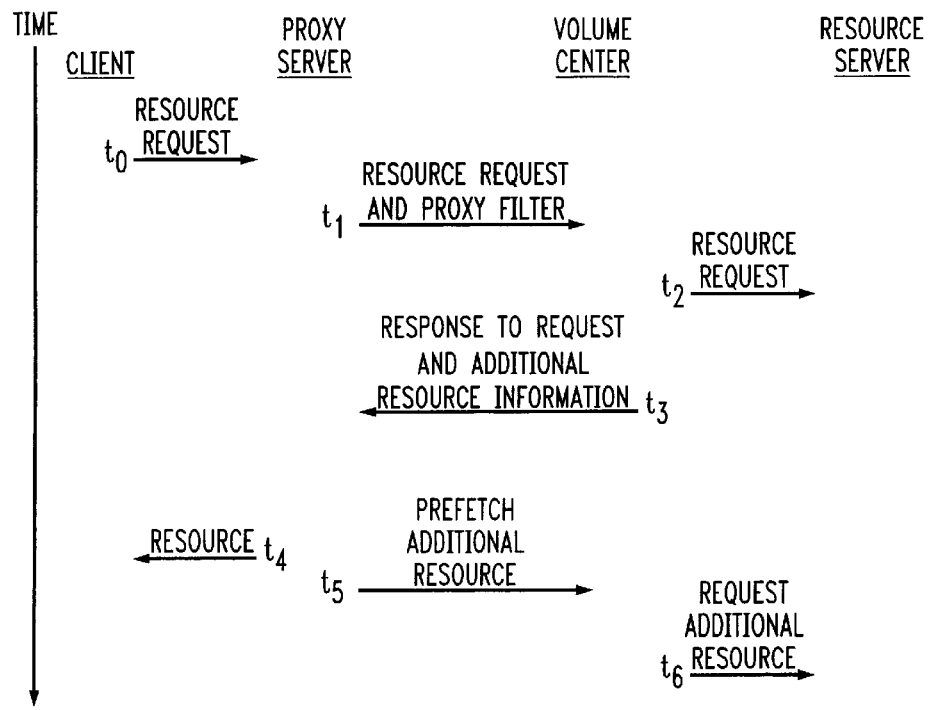
FIG. 6 provides an illustration of a time line in accordance with an implementation of another embodiment of the present invention.

Thus, in summary, embodiments of the present invention can be understood with reference to the time lines shown in FIGS. 3 and 6 of the application.

More particularly, in those circumstances where the client, such as a user of computer 101 in FIG. 1 sends a request for a resource to a proxy server at time to, the proxy server determines whether it is necessary to request the resource from the resource server itself. If it determines based on the cache coherency plan which it has implemented, to forward a resource request it does so at time $t_1$ and appends a proxy filter to that resource request. The resource server then identifies a set of additional resources which could constitute one or more resources that are related to the requested resource because they are contained in the same volume and because they satisfy the proxy filter which was forwarded with the resource request. The resource server then supplies the response to the request and the additional resource information at time $t_2$. The response to the request could be constituted either simply by a notice that the requested resource copying the cache is valid or it could include a new copy of the requested resource. The additional resource information would include appropriate information regarding additional resources based on the proxy filter information which was supplied by the proxy server. At time $t_3$ the proxy server could forward the requested resource to the client and at time $t_4$, if the proxy server so desired, it could prefetch one or more of the additional resources referred to in the additional resource information forwarded from the resource server.

In an alternative embodiment of the present invention rather than relying on a single resource server, a volume center might be employed which identifies resources across one or more resource servers. FIG. 6 illustrates a possible time line for signaling activities which might arise where a volume center is arranged between a proxy server and one or more resource servers. In this circumstance the resource request is sent by the client to the proxy server at time $t_0$. The proxy server can then send a resource request and a proxy filter to the volume center at time $t_1$, rather than to the resource center as in the embodiment of FIG. 3. The volume center can then detect whether additional information must be obtained about the requested resource from the resource server associated with that resource. If it is determined that either the volume center needs to validate the copy of the resource or needs to obtain a fresh copy of the resource, then a resource request can be forwarded to the resource server at time $t_2$. The volume center then receives a response to the request and appends to that response additional resource information and forwards that back to the proxy server at time $t_3$. This additional resource information would be similar to that described above with respect to FIG. 3. In particular, the additional resource information would be based on volume information relating the requested resource to additional resources and it would in part rely on the proxy filter definition supplied by the proxy server. At time $t_4$ the proxy server could forward the requested resource to the client. At time $t_5$ it could send the request to prefetch the additional resource. In turn, the volume center having received the request for prefetching the additional resource could request the, additional resource from the resource server associated with the additional resource. This latter resource server could be different from the initial resource server.

Having now provided an overview of the operation of the present invention, details regarding an implementation of the protocol for piggybacking responses to the proxy as well as how to create the proxy filters, the volumes from which additional resources will be retrieved, and the volume centers will now be described in the following sections.

Pipgybacking Protocol

Additional information about resource characteristics and access patterns of the server can improve the effectiveness of proxy policies for cache replacement, cache coherency and prefetching. A server has considerable knowledge about each resource including the size and content type, as well as the frequency of resource modifications. By accumulating information about requests from a large number of proxies and clients, the server can gauge the popularity of each resource and the likelihood that certain resources are accessed together. On the other hand, the proxy has knowledge about its pool of clients and their access patterns including the requests that are satisfied without contacting the server. In addition, the proxy has information about the size of its cache, as well as the policies for cache allocation, replacement and coherency. Furthermore, the proxy may have certain limitations on the types of resources or content that might be stored. An example of such a restriction might be a case where the proxy does not cache certain types of images or does not cache resources that exceed a certain size.

To bridge the knowledge gap between servers and proxies it is proposed that servers should send information about their resources customized to interested proxies. The exchange of this additional information should not impose an excessive burden on any of the web components. Though the server may measure access patterns across its collection of resources, the server cannot afford to maintain state for each proxy. Similarly, the proxy cannot afford to maintain state for all servers. To limit the load on the network this additional information exchange should not significantly increase the bandwidth consumption or the number of TCP connections. The combination of proxy filters, server volumes, and piggybacking provides an effective way to send useful information to the proxy without requiring complex data structures. Each piggyback element contains the identifier, size, and Last-Modified time of a single resource at the server, from the same volume as the requested resource. The proxy filter controls how many piggyback elements are to be sent, as well as which resources are included in the list.

The proxy stores the unique resource identifier of each resource "r" in its cache along with the Last-Modified time (indicating the version of the resource at the server) and the expiration time (indicating when the cached resource requires validation before use). This is an implementation where coherency is tied to a time-to-live (TTL) determination. A description of the handling of a client GET request for a resource r will illustrate the piggyback in control.

Presume for the moment that the proxy receives a client request for the resource "r". If the cache has a copy of that resource and the expiration time has not been reached, the proxy returns the resource directly to the client. A cache miss triggers a regular GET request to the server and a cache hit with an expired copy of "r" generates a GET request with an If-Modified-Since modifier and a Last-Modified time of the proxy's copy of resource "r". In either case, that is a regular GET request or a Modified GET request, the proxy appends a filter to the request to aid the server in customizing a piggyback response related to a volume of information associated with resource "r".

If the server receives the Modified GET request and the proxy-specified Last-Modified time is greater than or equal to the Last-Modified time at the server then the server simply validates the resource sending a Not Modified response. Otherwise, the server transmits an OK response with a fresh version of the resource as it would in the case of an unmodified GET request. In either case the server constructs a piggyback message with the volume identifier (ID) and information about related resources based on the identity of resource "r" and the proxy-specified filter. An element in the piggyback list includes a resource identifier, for example "p", that resource's Last-Modified time and the size of that resource.

Upon receiving the server response message, the proxy returns the resource to the client and updates the cache. Then caching a new copy of "r" as part of an OK response, the proxy saves the Last-Modified time and assigns the expiration time (some additional time in the future where that additional time defines a freshness interval). The proxy also updates the expiration time upon receiving a Not-Modified response from the server. Next, the proxy processes each resource "p" in the piggyback list. If the proxy already has a fresh copy of p, for instance, the expiration time is updated. If the cache has a copy of resource p, but it is out of date, the proxy can delete the stale copy or prefetch a new version of the resource. Furthermore, the proxy can also prefetch the resource identified in the piggyback list if it is not presently in the cache.

Having described the protocol the following sections will now provide more description with regard to the proxy filter which is piggybacked onto the request and the volume creation operation which has an impact on identifying resources which might be associated with a particular requested resource.

Proxy Filters

Despite the potential benefits of the piggyback messages, a direct application of the protocol may repeatedly send the same information to the proxy when there are several accesses to the same server in a short period of time. This introduces unnecessary overhead on the server, the proxy and the communication network. To avoid excess traffic, the protocol should limit the frequency of piggybacked messages to each of the proxy cites. If the server were to explicitly regulate the transmission of piggyback messages by tracking recent transmissions to each proxy, it would have to maintain per-proxy state. Instead, the protocol of the present invention provides an effective way for the proxy request messages to implicitly control the pacing of piggyback responses from the server. To control piggyback traffic without maintaining state, the proxy can randomly set an enable/disable bit, or employ simple frequency control techniques, such as disabling piggybacks from servers which have sent a piggyback response within the last preset time interval, for example, one minute. The frequency control techniques can be randomized or augmented with information about usefulness of recently piggybacked responses. These techniques do not require the proxy to maintain per-resource or per-volume state, making them particularly efficient for servers with a large number of volumes as would occur with probability-based volumes such as those discussed below.

When the number of volumes is small, the proxy stores a list of recently piggybacked volumes (RPVs) for each server, or for a subset of popular servers. Each list element includes the volume identifier and the time the last piggyback message for that volume was received. The proxy can limit the RPV list based on a timeout or a maximum size basis; and maintain them efficiently as first-in-first-out (FIFO) lists in a hash table keyed on the server IP address. The proxy includes the RPV list in its filter and the server decides if information should be piggybacked or not. A piggyback reply includes the resource's volume identifier which can be added to the RPV list at the proxy. The appropriate time interval for removing an element from the RPV list depends on the freshness interval in the cache, as well as the frequency of accesses to the server. For example, the proxy should not keep a volume in an RPV list for longer than the freshness interval, since this would preclude a server from sending refresh information for resources in this volume. Even smaller time intervals are appropriate to further improve the freshness of the proxy cache although this occurs at the expense of additional piggyback traffic.

In addition to limiting the frequency of piggyback traffic, the proxy filter customizes the contents of each piggyback message. Even though resource volumes are constructed from anticipated or measured access patterns, these volumes are likely to include some information that is not useful to a given proxy. Different proxies may serve vastly different communities of users, and may impose a wide range of policies that affect the type of piggyback information that is useful. The proxy can customize the piggyback message by specifying a maximum number of elements, a limit on the size or content type of the resources included in the list, or a minimum threshold of access frequency or probability. For example, clients on low-bandwidth wireless links are likely to disable the transfer of images and avoid downloading large resources; hence, a proxy serving such a group does not need to receive piggyback information for such items. Similarly, a proxy that must provide up-to-date information such as stock quotes for busy clients may decide to disable caching of resources that change frequently; since the proxy always contacts the server directly to handle these client requests, the server need not piggyback information about rapidly changing resources.

Thus, proxy filters can serve the purpose of limiting the information that is piggybacked on to the responses to resource requests either limiting its content based on particular parameters which may be set by the proxy.

Resource Volumes

The effectiveness of the piggybacking protocol depends on the server's ability to group related resources into volumes. Upon receiving a request for a resource, the server should be able to generate a list of other resources that are likely to be requested in the near future. In evaluating volume construction techniques, three metrics are considered. These metrics relate to how various applications would use the piggyback information.

A first metric is a prediction fraction, that is the likelihood that a resource requested at the proxy has appeared in at least one piggyback message in the last T second. This metric captures the recall of the prediction scheme or the fraction of client accesses that can capitalize on recent piggyback information and is important for all of the proxy policies.

A second metric is the true prediction fraction which is a likelihood that a resource that appears in a piggyback message will be accessed by a client in the next T seconds. Resources that appear in multiple piggyback messages in the same time interval are counted as a single prediction. This metric captures the precision of the volume-construction technique and is important for prefetching policies.

A third metric is the update fraction which is the likelihood that a resource requested at the proxy has been predicted in the last T seconds and appeared in a previous request in the last C seconds where C is greater than T. This metric captures the likelihood that the client request accesses a cached resource that has been updated by a recent piggyback message, and is important for cache coherency and cache replacement policies.

In addition to maximizing these three performance metrics a good volume-construction scheme should limit the average size of piggyback messages. An optimal volume would maximize the fraction predicted or the fraction updated.

One type of volume is the directory based volume. For example, one-level volumes would assign www.foo.com/a/b.html and www.foo.com/a/d/e.html to the same volume, though www.foo.com/f/g.html would belong to a different volume as the first two resources match at least to the first level of the directory prefix. If volumes were based on zero-level prefixes then all three of the identified resources would belong to the same volume. The example described above in the overview illustrated circumstances where one level volumes would associate certain resources and exclude others even though they were all resources in the same server sharing a zero level prefix. Directory-based volumes are based on the heuristic that resources in the same directory or sub-directory are likely-to have related content and or occur as embedded HREF links in the same (or related) Web pages.

Based on a static volume definition, the server can maintain volume elements in a collection of FIFO lists partitioned by resource sizes and content type. For example, the volume could have one list for large images, and another list for small text pages, since the proxy filter can specify that the server piggyback message include popular items of certain content types and sizes. Using the last-access-time as the popularity metric for adding, removing, updating and filtering volume elements, permits constant time operations for maintaining the volume at the server.

An approximate way to rank volume elements in order of popularity is using move-to-front semantics to place a requested resource at the head of its FIFO; this ensures that piggyback messages include the most recently accessed elements in the volume. The server can control the size of volume by removing unpopular entries from the tail of the logical FIFO.

A second configuration for constructing volumes could be based on the measurement of access patterns. This will be referred to as constructing probability-based volumes. By observing a stream of requests, the server can estimate pair-wise dependencies between resources. Let $p_{s/r}$ be the proportion of requests for resource r that are followed by a request for resource s by the same source within T seconds. Resource "s" is included in r's volume if $p_{s/r} \geq$ a threshold probability $p_t$. When a proxy requests a resource "r", the server constructs a piggyback message from the set of resources s with $p_{s/r} \geq p_t$. The server can estimate the probabilities $p_{s/r}$ from the stream of requests in a periodic fashion, such as once a day or once a week, or in an on-line fashion if accessed patterns and resource characteristics change frequently. It should be noted that the volume relationship is not symmetric, that is while s can belong to r's volume the reverse may not be true.

The server computes probabilities for counters $c_{s/r}$ for pairs of resources that occur together, as well as counters $c_s$ for occurrences of individual resources, where $p_{s/r}=c_{s/r}\div c_r$. An efficient algorithm can compute these counters across the requests by each source. In sequencing through the access stream for each source, the server maintains a FIFO list of requests in the last T seconds. In processing a new request for resource s, the server sequences from the end of the list in increments $c_{s/r}$ for each resource r on the list. The server stops sequencing upon encountering a previous access to resource s or the end of the T-second window. Counter $c_s$ is incremented and the current access to s is added to the end of the list, and any previous accesses beyond the T-second window are removed. Repeating this algorithm across the different sources the server can efficiently compute the counter $c_{s/r}$ and the implication probabilities $p_{s/r}$. Computing probability implications for a set of n resources can potentially require $n^2$ counters, though many pairs of resources do not typically occur together. To reduce the memory requirements the algorithm performs random sampling to decide if and when to create a counter and when to simply ignore a pair of resources. For example, suppose a resource r occurs less than T-seconds before resources s. If the counter $c_{s/r}$ does not exist, a counter with probability inversely proportional to the frequency of accesses to r and the threshold probability $p_t$ is created. Pairs that often occur together are likely to have a counter $c_{s/r}$ and an estimate $p_{s/r}$ without needlessly generating counters for pairs of resources with low implication probabilities.

Further reductions in processing and memory overhead are possible by combining directory-based volumes with estimation of probability implications. For example, the probability implication algorithm could generate counter $c_{s/r}$ and estimate probabilities $p_{s/r}$ only for resources s and r with the same directory prefix. Using directory prefixes to reduce the number of counters has the potential to avoid locating pairs that inadvertently occur together because both resources are popular or are accessed during the same time interval by two different clients of the same proxy. To improve the accuracy and reduce the size of probability-based volumes, the volumes can be trimmed by focusing on effective predictions. After estimating the implication probabilities $p_{s/r}$ those servers can evaluate the potential effectiveness of piggyback information by measuring how often a piggyback message generates a new prediction for resource s. This is particularly important when an access to s is often preceded by a sequence of requests by the same proxy, as would occur in downloading a Web page with multiple embedded images.

To improve the accuracy and reduce the size of probability-based volumes, the volumes can be trimmed by focusing on effective predictions. Quite often, a request for resource s is preceded by accesses to several other resources, each of which is credited with generating a prediction for s. This is particularly important when an access to s is often preceded by a sequence of requests by the same proxy, as would occur in downloading a Web page with multiple embedded images. With a small amount of additional processing, it is possible to measure how often an access to r generates a row predicted for s. If most of r's predictions are redundant (subject to an effectiveness threshold), then s is removed from r's volume, leaving only the effective predictions.

The notion is to thin the volumes by deleting redundant piggybacks and eliminating ones that make false predictions. Piggybacks from the server are treated as predictions at the proxy and if no client or user behind the proxy requests those predictions, they turn out to be "false predictions". Effectiveness thresholding is a way to reduce the number of false predictions.

Pairwise implication evaluates performance of each "placement" of a resource in a volume, assuming "nothing else is there" (no other related placements are working now). In some sense, it is an upper bound for the utility of each "placement". "Effective thresholding" attempts to measure the value of the placement assuming (almost) that "everything is there".

More accurately, each placement of $r_1$ in $r_2$'s volume generates a number of predictions of a request to $r_2$. "Effective thresholding" measures how many of these predictions would not have been made otherwise, previously (we still credit a placement for a prediction, even if another placement "predicts" $r_1$ just after it). But if $r_1$ is already predicted we do not credit the placement.

Volume Centers

Server overhead could possibly be further reduced by maintaining volumes in an element that connects one or more servers to the network, say a router or a gateway. This "volume center" can observe traffic between proxies and servers and glean Last-Modified time information and access patterns while being transparent to those two elements. The volume center can also update volumes accordingly. In many cases, the volume center can obviate the need for direct communication between the proxy and server sites. For example, suppose a proxy transmits a GET-If-Modified-Since request for resource r at the server. After intercepting the TCP establishment message and the GET request, the volume center can generate a Not-Modified response if it has recent Last-Modified time information that implies that r has not changed. If the volume center cannot satisfy the get request because the resource has changed or the volume has out of date Last-Modified time information for r the GET request is simply forwarded to the server for normal handling. As indicated above however, the volume center then would be in a position to include the additional or piggyback volume information back to the proxy where the piggyback information is selected in part based on the proxy filter provided by the proxy along with the resource request. In this manner the volume center can provide the advantages attainable with this piggybacking protocol without burdening the resource servers themselves.

Conclusion

The above piggybacking operation which further employs the volume construction and proxy filters can have a number of different applications. For instance, the process may be employed to provide persistent connections. In particular, the HTTP 1.1 protocol permits a TCP connection to remain open between the server and the client until either side decides to close it. The server along with the piggyback can include an estimated time until the next request which can be used as a hint if and when the persistence connection should be closed. The invention might also be employed in connection with enhancing cache replacement. More particularly, the servers' piggyback information can guide cache replacement decisions. Rather than the typical removal of the least-recently-used item, the proxy could continue to cache items that have appeared in recent piggyback messages, as long as the resource has not been modified at the server. More generally, the proxy could combine piggyback information with other cost metrics that impact the cache replacement decision including resource size, content type or frequency of modification. The effectiveness of the cache replacement strategy depends on the accuracy of the piggyback information. The suboptimal cache replacement decision may not be as detrimental as an incorrect prefetching decision. A third application for the present invention involves informed fetching. Piggybacked meta attributes resources that are likely to be requested soon can be kept and used by clients to prioritize the fetching queue when users request these resources. The scheduling is performed prior to contacting the servers. For example, shorter files can be fetched first (when there is not enough bandwidth for all outstanding requests). If bandwidth between proxy and server is congested, such a scheduling strategy decreases average per user latency such that users requesting small files do not have to wait long and users with large requests wait a bit longer.

Figure 4:
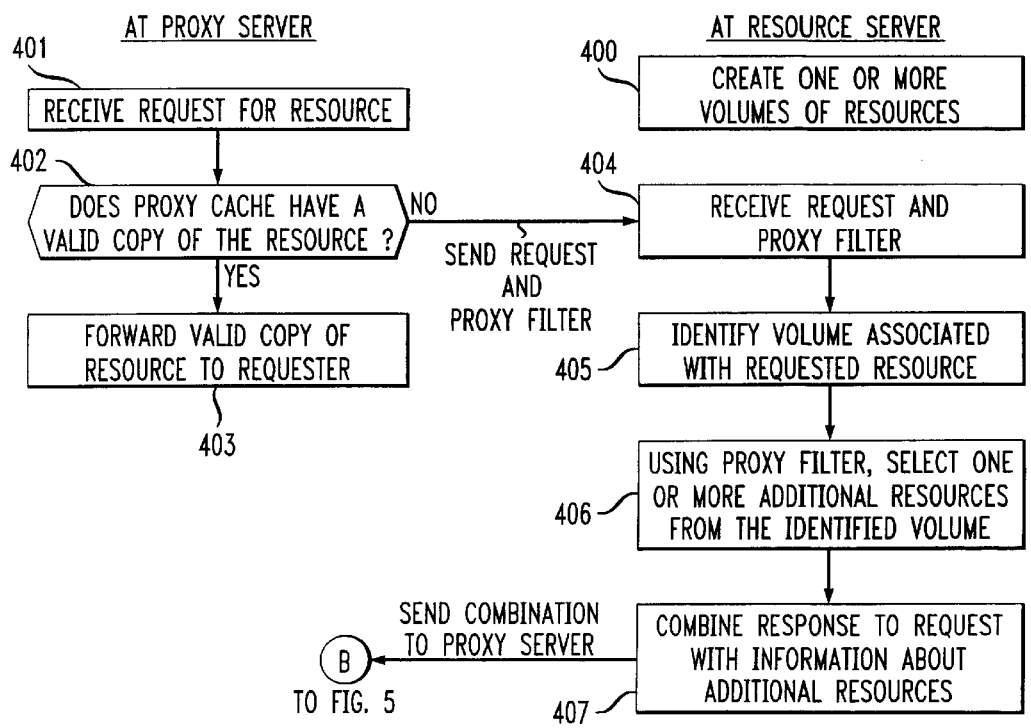
FIGS. 4 and 5 together provide a flow chart describing a process for enhancing proxy server information in accordance with an embodiment of the present invention.
Figure 5:
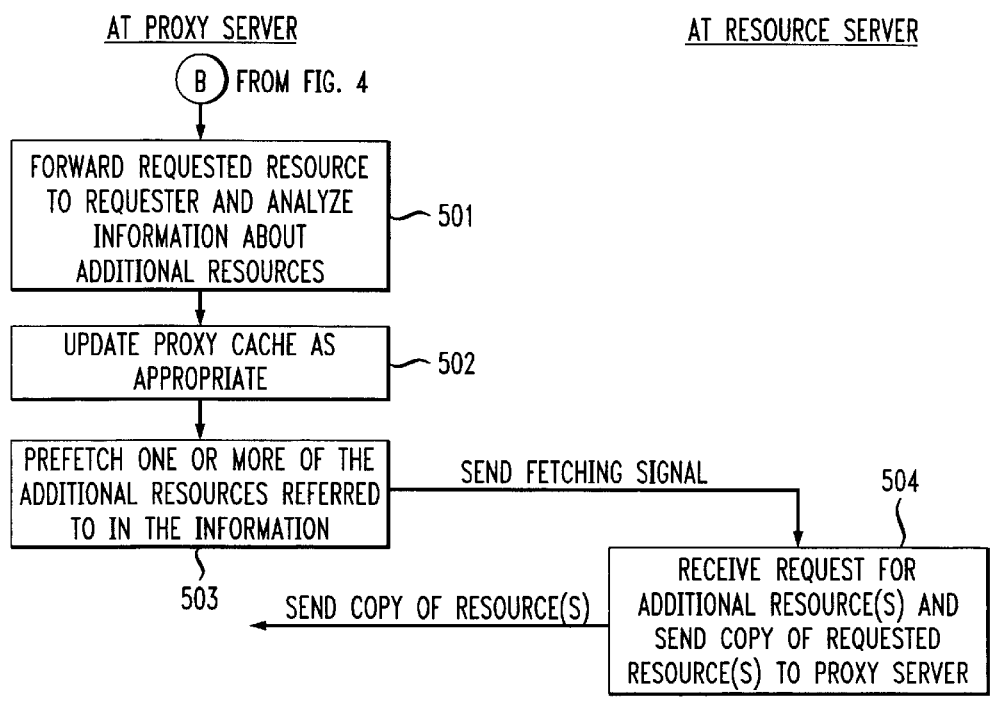

A process flow for implementing an embodiment of the present invention will now be described with respect to FIGS. 4 and 5. It is shown that various steps may occur at a proxy server and at a resource server. These are representative locations of where the operations might be performed. Steps might be otherwise divided in terms of location or might be provided with a different time order and still achieve the results of the present invention. Similarly, it should be recognized that rather than the resource center and proxy server alone, a volume center could be employed in a manner consistent with that described above and still implement the invention outlined in the flow diagram of FIGS. 4 and 5.

Resource server could create one or more volumes or resources in a manner described above, step 400. A proxy server could receive a request for a resource from a client, step 401. The proxy server determines whether an associated proxy cache has a valid copy of the resource, step 402. If a valid copy is present then the proxy forwards that valid copy of the resource to the requester, step 403. If the proxy does not have a valid copy of the resource, or if the cache coherency protocol requires that in each instance the proxy must determine whether the requested resource is valid with a check to the resource server, then the proxy server sends a resource request and a proxy filter to the resource server. The proxy filter can include the limiting parameters or characteristics for example, resource type or resource size, described above. The resource server receives the request and the proxy filter, step 404. The resource server identifies a volume or volumes that are associated with the requested resource, step 405. Using the proxy filter the resource server selects one or more additional resources from the identified volume (s), step 406. The resource server then combines a response to the request with piggyback information, that is, information about additional resources, step 407. The combination response is sent to the proxy. At the proxy, once the combination response has been received the proxy forwards the requested resource to the requester, either forwarding the validated copy from the cache or a copy of the resource forwarded by the resource server, and analyzes information in the piggyback response, that is information about additional resources, step 501. The proxy updates the proxy cache as appropriate, step 502. This updating operation can include updating with respect to the requested resource as well as updating with respect to additional resources identified in the piggybacked information copies of which are already stored at the proxy and which have been validated by the piggyback information. The proxy can then prefetch one or more of the additional resources referred to in the piggyback information, step 503. This would entail sending a fetching signal to the resource server or servers which hold the identified related resources. The resource server(s) receive requests for additional resource(s) and send copies of the requests resource(s) to the proxy, step 504.

This process flow is a general description of the operation of requests and responses between the proxy server and the resource server in one embodiment. These process flows can be further modified in accordance with the particular parameters attributed to the proxy and the resource server, the volumes and the proxy filters as described above.

The above technique provides a unique mechanism for enhancing the coherency of a proxy cache while avoiding unnecessary burdens on the network. By using volume groupings for multiple resources, proxy filters for limiting the information that a particular proxy cache might be interested in, and piggyback information attached to responses to requests for particular resources more effective updating of proxy caches without overloading the network links.

What is claimed is:

1. A method for effectuating a transfer of information to a proxy server, the method comprising the steps of:
  receiving at a resource server a request for information regarding a first resource;
  generating at said resource server a response to said request, said step of generating including the substeps of:
    retrieving the requested information,
    identifying at least one further resource related to said first resource, said substep of identifying at least one further resource includes the substeps of:
      identifying a filter related to a proxy that sent the received request, and
      identifying, based on the output of the interpreting step, at least one further resource related to said first resource,
    compiling additional information which relates to said identified further resource, and
    combining the retrieved information and the additional information; and
  transmitting said response to the proxy server.

2. The method of claim 1 wherein the compiled information which relates to an identified further resource includes an identifier for said further resource.

3. The method of claim 2 wherein said compiled information which relates to an identified further resource includes attribute information regarding said further resource.

4. The method of claim 3 wherein said attribute information is selected from the group comprising resource size, resource content type and last modified time of a resource.

5. A device-readable medium storing program instructions for performing a method of operating a resource server and effectuating a transfer of information to a proxy server, the method comprising the steps of:
  receiving at the resource server a request for information regarding a first resource;
  generating at said resource server a response to said request, said step of generating including the substeps of:

retrieving the requested information, identifying at least one further resource related to said first resource, said substep of identifying at least one further resource includes the substeps of:

interpreting a filter related to a proxy that sent the received request, and identifying, based on the output of the interpreting step, at least one further resource related to said first resource, compiling additional information which relates to said identified further resource, and combining the retrieved information and the additional information; and transmitting said response to the proxy server.

6. The device-readable medium of claim 5 wherein the compiled information which relates to an identified further resource includes an identifier for said further resource.

7. The device-readable medium of claim 6 wherein said compiled information which relates to an identified further resource includes attribute information regarding said further resource.

8. The device-readable medium of claim 7 wherein said attribute information is selected from the group comprising resource size, resource content type and last modified time of a resource.

9. A device-readable medium storing program instructions for performing a method of operating a resource server and effectuating a transfer of information to a proxy server, the method comprising the steps of:

receiving a request for information regarding a resource;

generating a response to said request, said step of generating including the substeps of, retrieving the requested information, reviewing, volume information correlated to the resource, determining a set of additional information to be related to said resource including the substeps of, analyzing the received request to identify the resource associated with request and to interpret a filter related to a proxy that sent the received request;

identifying, based on the output of the analyzing step, at least one further resource related to said resource including the substeps of:

reviewing volume information correlated to the resource associated with the request; and creating a set of further resources based on said review and the interpretation of the filter, and compiling information about any identified further resource, and combining the retrieved information and the set of additional information; and transmitting said response to the proxy server.

10. The device-readable medium of claim 9 wherein the compiled information regarding said at least one further resource includes an identifier for said at least one further resource.

11. The device-readable medium of claim 10 wherein said compiled information regarding said at least one further resource includes attribute information regarding said at least one further resource.

12. The device-readable medium of claim 11 wherein said attribute information is selected from the group comprising resource size, resource content type and last modified time of a resource.

* * * * *